United States Patent [19]

Ives et al.

[11] Patent Number: 4,974,442
[45] Date of Patent: Dec. 4, 1990

[54] METHOD AND APPARATUS FOR CALIBRATING ROLLING MILL ON-LINE LOAD MEASURING EQUIPMENT

[75] Inventors: Kenneth D. Ives, Valparaiso; David A. Hodges, Portage, both of Ind.

[73] Assignee: Westinghouse Electric Corp., Pittsburgh, Pa.

[21] Appl. No.: 343,763

[22] Filed: Apr. 26, 1989

[51] Int. Cl.$^5$ .......................... G01L 25/00; G01L 5/00
[52] U.S. Cl. ..................................... 73/1 B; 73/862.55
[58] Field of Search ................. 73/1 B, 862.55, 862.54

[56] References Cited

U.S. PATENT DOCUMENTS

| | | | |
|---|---|---|---|
| 3,918,302 | 11/1975 | Skelton et al. | 73/862.55 X |
| 3,995,471 | 12/1976 | Konomi et al. | 73/1 R |
| 4,131,004 | 12/1978 | Eibe | 73/35 X |
| 4,186,579 | 2/1980 | Eibe | 72/35 X |
| 4,901,585 | 2/1990 | Shepard et al. | 73/862.55 X |

Primary Examiner—Tom Noland
Attorney, Agent, or Firm—M. J. Moran

[57] ABSTRACT

In place calibration of the permanent on-line force measurement system of a rolling mill is performed by replacing the working rolls with dedicated calibration rolls, which can be scrap working rolls. Discontinuities formed in the cylindrical surfaces of dedicated calibration rolls, such as flat surfaces or preferrably flat bottomed longitudinal grooves, are engaged by interface members which also engage confronting flat surfaces or grooves in calibration load cells inserted between the dedicated calibration rolls. The interface members, which are made of a softer material than both the calibration rolls and the load cells, cold flows to evenly distribute the load and eliminate the need for precision machining of the interfaces. The dedicated calibration rolls can also be fixed, such as by welding, to dedicated calibration roll chalks which mount the calibration rolls in the mill housing to further prevent roll rotation and ejection of the calibration load cells. In some instances, when the braking effect of the deenergized work roll drive motor is sufficient, calibration can be performed using the normal working rolls with the aluminum interfaces with the calibration load cells having concave grooves which receive the working rolls.

3 Claims, 4 Drawing Sheets

METHOD AND APPARATUS FOR CALIBRATING ROLLING MILL ON-LINE LOAD MEASURING EQUIPMENT

BACKGROUND OF THE INVENTION

1. Field of the Invention

This invention is directed to a method and apparatus for calibrating on-line load measuring equipment in rolling mills, such as hot and cold reduction mills and temper mills.

2. Background Information

Rolling mills are commonly provided with integral force measuring equipment for use in controlling the product produced by the mill. There is presently no commercially available means to calibrate a high capacity rolling mill force monitoring system. The system is calibrated in the factory before installation, but not as a system in service. However, many of the load cell configurations used in such systems can deteriorate under the non-uniformly applied multi-million pound loading to which they are exposed. The uneven loading results from many factors such as uneven thickness and/or temperature across the product fed into the mill. It is desirable to be able to calibrate the on-line force monitoring system in place, however, load cells cannot just be placed between the rolls because the uneven loading either causes the rolls to turn ejecting the load cells, or crushes the load cells at one corner or edge.

There remains a need therefor for a satisfactory method and apparatus for calibrating on-line rolling mill force measuring systems in place.

There is also a need for such an apparatus which can perform an in place calibration economically, accurately, and in a minimum amount of time.

It would be desirable to be able to perform such an in place calibration using scrap components.

SUMMARY OF THE INVENTION

These needs and desires, and others, are satisfied by the invention which comprises calibration force measuring means mounted between the working rolls of a rolling mill by interface members which are softer than both the rolls and the calibration force measuring means and means preventing rotation of the rolls so that the calibration force measuring means are not ejected when high calibrating loads are applied to the rolls. By making the interface member of softer material than both the rolls and the calibration force measuring means, the interface members cold flow to form interfaces which more evenly distribute the load applied to the calibration force measuring means without the need for precision machining.

In the preferred form of the invention, the working rolls are replaced by dedicated calibration rolls which may be scrap working rolls with their own dedicated chalks. The means preventing rotation of the rolls may be a discontinuity in the cylindrical surface of the dedicated calibration rolls, such as a flat surface, but preferably a longitudinal, ideally flat bottomed, groove. Corresponding longitudinal, preferably flat bottomed grooves are also formed in the confronting surfaces of the calibration load measuring means with the interface members comprising locking bars, preferably of softer material than both the dedicated roll and the calibration load measuring means, which engage the confronting grooves. The means preventing rotation of the rolls can alternatively, or in addition, include means which secure the dedicated calibration rolls to the dedicated calibration chalks. In the preferred embodiment, this securing means takes the form of an annular plate welded to both the dedicated calibration roll and the dedicated calibration chalk. Rotation of the rolls can also be restrained, both for the dedicated rolls and the normal working rolls, by the drag of the deenergized working roll drive motor.

The invention embraces both the method and apparatus for calibrating the permanent on-line load measuring system in a rolling mill. The invention makes possible such a calibration, which heretofore could not otherwise be performed, and does so in a manner which takes little time even where dedicated rolls replace the normal working rolls.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

Figure 1:
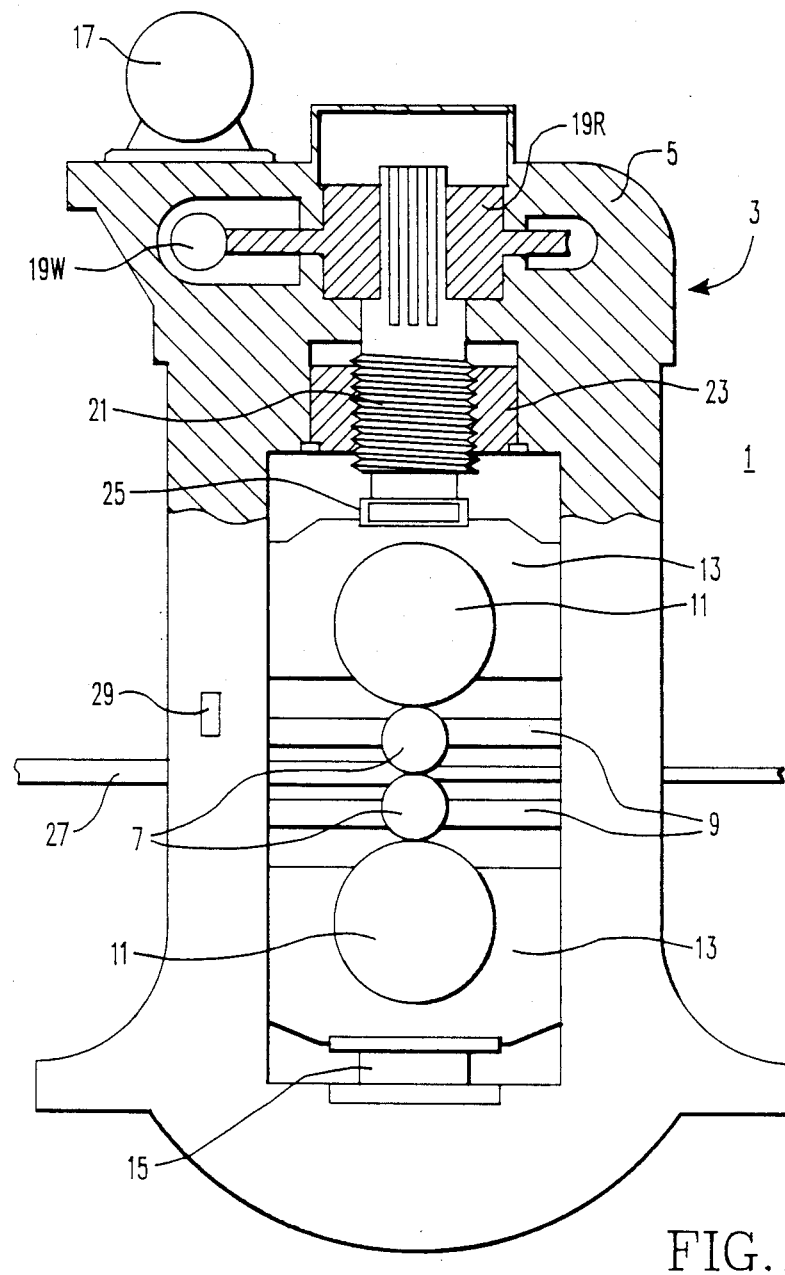
FIG. 1 is a side elevation view with some parts in section illustrating a prior art rolling mill to which the invention may be applied.

Referring to FIG. 1, a rolling mill 1 to which the present invention may be applied, comprises one or more mill stands 3 each of which includes a mill housing 5 having spaced sections extending vertically at each side of the mill stand. A pair of working rolls 7 are journaled at each end in working roll chalks 9 which are mounted in the spaced sections of the housing 5. A pair of back up rolls 11 are journaled in backup roll chalks 13 mounted in the mill housing 5 above and below the working rolls. The lower backup roll chalks 13 rest on sleds 15 which are also used to maneuver the rolls and their chalks during insertion and removal from the mill housing 5.

A drive motor 17 mounted on the top of the mill housing 54 drives a worm gear 19W engaged by a rim gear 19R which turns a screw 21 threaded through screw block 23 to apply a working force through chalks 13 and 9 to the backup rolls 11 and working rolls 7 respectively. Load cells 25 between the screws 21 and backup roll chalks 13 provide a permanent on-line system for measurement of the working force generated by the mill stand.

In operation, the product 27 such as a sheet of steel is fed from left to right in FIG. 1 through the work rolls 7. The exemplary mill, which is a reduction mill, thins the product. The requires very high working forces which in some instances reach several thousand metric tons. As is well known in the art, the backup rolls 11 bearing against the work rolls 7 resist the tendency of the work rolls to bend under these very high forces generated in the mill stand. Strain gauges 29 which measure elongation of the mill housing also provide an indication of the load applied to the product 27. The measurements generated in the load cells 25 on each side of the mill and in the strain gauges 29 are used by the mill operator along with other measurements to control the rolling process.

At the present time, there are no means available for calibrating the load cells 25 in place within the rolling mill. The load cells are calibrated in the factory but not once they are placed in service. As mentioned above, the load cells 25 can be damaged and provide inaccurate readings as a result of uneven loading. The present invention provides a means and apparatus for in place calibration of the permanent on-line working force measuring load cells and of the strain gauges 29.

Figure 2:
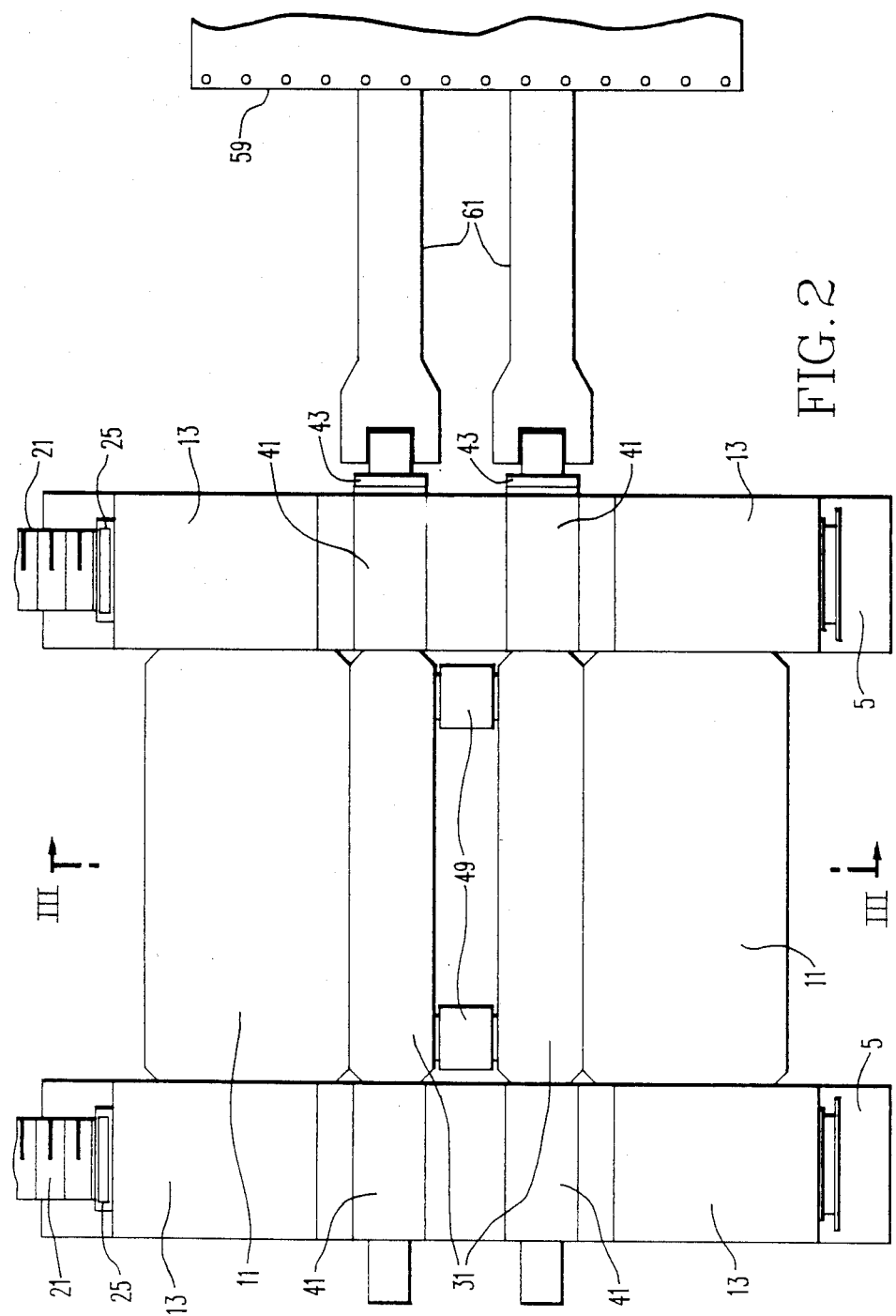
FIG. 2 is a schematic front view of the rolling mill of FIG. 1 incorporating the invention.
Figure 3:
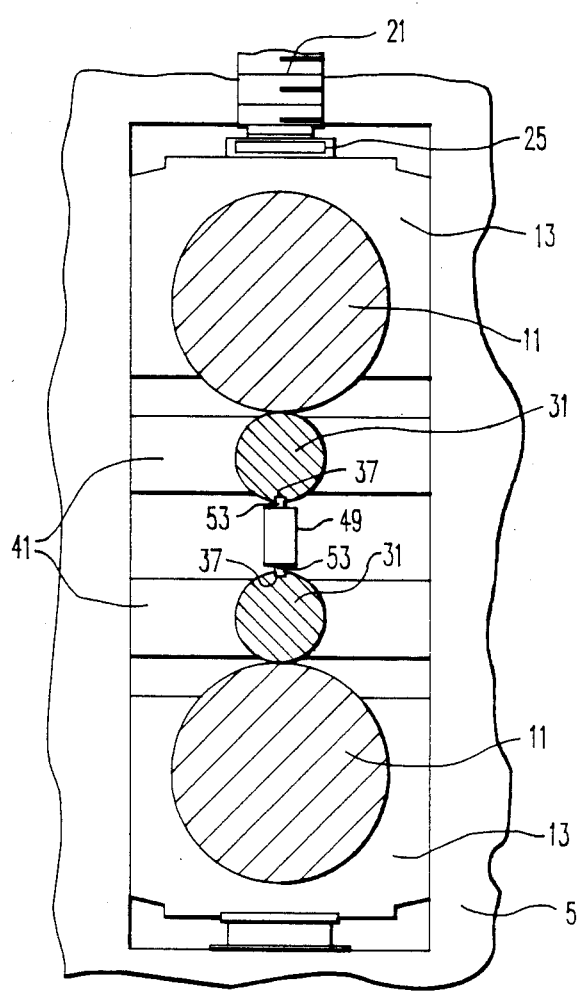
FIG. 3 is a vertical section through the chalks of the rolling mill incorporating the invention illustrated in FIG. 2.
Figure 4:
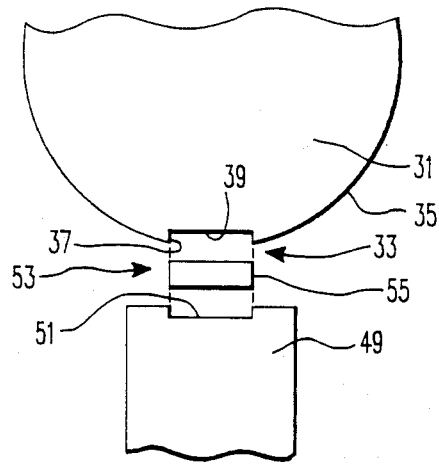
FIG. 4 is an enlarged view of a portion of FIG. 3 illustrating the interlocking of a dedicated calibration roll with a calibration load cell.

In the preferred form of the invention shown in FIGS. 2-4, the working rolls 7 are replaced by dedicated calibration rolls 31. The dedicated calibration rolls 31 are preferably scrap working rolls. Working rolls have a limited life, especially in a hot reduction mill. After every few hours of operation, the working rolls become uneven as a result of uneven loading and are removed and ground down. When a minimum diameter is reached, the working rolls are scraped. Rolls in hot reduction mills can also become fire cracked and must be scraped. While these scrap rolls are no longer usable for rolling, a set can be used for the dedicated calibration rolls.

The dedicated calibration rolls 31 are provided with a discontinuity 33 in their generally cylindrical surface 35. In the preferred form shown in detail in the exploded view of FIG. 4, the discontinuities take the form of longitudinally extending grooves 37 which preferably have a flat bottom surface 39.

Figure 7:
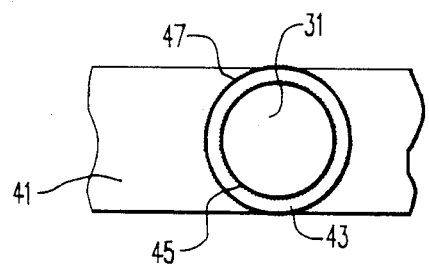
FIG. 7 is a side view illustrating fixing of the calibration roll to the calibration roll chalk.

The dedicated calibration rolls 31 are provided at each end with dedicated calibration roll chalks 41 which can also be scrap components. As is well known, the chalks include bearings (not shown) in which the rolls are journaled for rotation. In the preferred embodiment of the invention, the dedicated calibration rolls are fixedly secured to the chalks to prevent rotation. One means of accomplishing this is shown in detail in FIG. 7. An annular plate 43 is welded at 45 to the dedicated calibration roll 31 and at 47 to the dedicated calibration roll chalks 41. Other mechanical means could be used to secure the dedicated calibration rolls 31 to the chalks 41 to prevent rotation as will be evident to those skilled in the art.

The dedicated calibration rolls 31 are mounted by their dedicated calibration roll chalks 41 in the mill housing 5 in place of the working rolls as illustrated in FIGS. 2 and 3. A pair of calibration load cells 49 are inserted between the dedicated calibration rolls 31 adjacent each end. These calibration load cells 49 are provided with grooves 51, which are also preferably flat bottomed, in their top and bottom surfaces (see FIG. 4). With the calibration load cells 49 in place these grooves 51 confront the longitudinal grooves 37 in the dedicated calibration rolls 31.

As best seen in the enlarged, exploded view of FIG. 4, an interface member 53 in the form of a rectangular locking bar 55 engages the grooves 37 and 51 to interlock the calibration load cells 49 and the dedicated calibration rolls 31 to prevent rotation of the latter and ejection of the calibration load cells. The locking bar 55 is made of a softer material than both the dedicated calibration rolls 31 and the calibration load cells 49. In the exemplary apparatus, the locking bar 55 is a $\frac{3}{8} \times 2$ inch bar of aluminum. This aluminum bar 55 cold flows to more evenly distribute the load applied to the calibration load cells 49 load as the multi-million pound working force applied by the mill takes the aluminum past its yield point in compression. This cold flow of the aluminum bar 55 eliminates the need for precision machining of the interfacing parts to remove imperfections such as milling marks.

Replacement of the working rolls with the preferred calibration system requires very little time since it is essentially involves the same procedures as used in periodically replacing the working rolls which is performed routinely in the operation of the rolling mill. The unique arrangement of the invention overcomes the problem of ejection of the calibration load cells through rotation of the rolls, and the effects of uneven loading on roughly machined parts.

Figure 5:
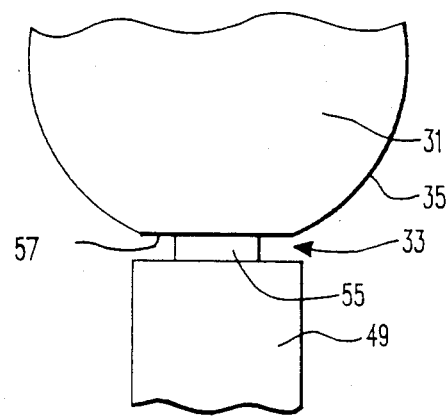
FIG. 5 is a view similar to that of FIG. 4 illustrating another embodiment of the invention.
Figure 6:
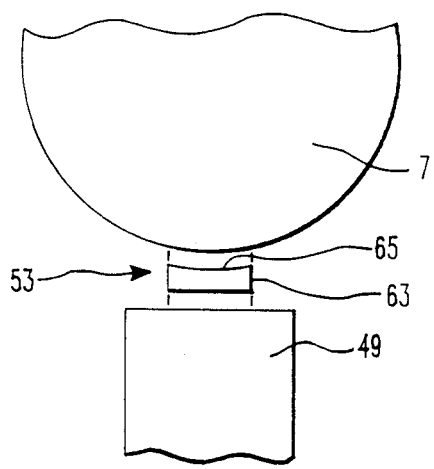
FIG. 6 is also a view similar to that of FIGS. 4 and 5 illustrating still another embodiment of the invention.

As an alternative to the grooves in the dedicated calibration rolls 31, the discontinuities in the generally cylindrical surfaces of these rolls can take the form of a flattened surface 57 as shown in FIG. 5. In older installations where the deenergized motor drive 59 connected to the work rolls by drive spindels 61 (see FIG. 2) offers a greater resistance to rotation, or other means are used to prevent roll rotation, the calibration can in some instances be performed with the working rolls 7 in place. The aluminum or other soft material interface member 53 in these instances can take the form of the bar 63 shown in FIG. 6 having concave groove 65 with a radius corresponding to the radius of the work roll 7. Obviously the calibration can be performed quicker in such a case since the working rolls need only be opened to insert the calibration load cells and aluminum bars without replacing the working rolls with dedicated calibration rolls.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. In a rolling mill having a mill housing, a pair of work rolls, work roll chalks mounting said work rolls in said mill housing, force generating means mounted in said mill housing applying a working force to said work rolls through said work roll chalks, and permanent, on-line force measuring means measuring said working force, the improvement comprising means for calibrating said permanent on-line force measuring means and including: calibration force measuring means; interface members mounting said calibration force measuring means between said work rolls, said interface members being of softer material than said work rolls and said calibration force measuring means to evenly distribute said working force over said calibration force measuring means, and rotation preventing means preventing rotation of said work rolls to retain said calibration force measuring means between said work rolls.

2. The rolling mill of claim 1 wherein said rotation preventing means preventing rotation of said work rolls includes deenergized drive motor means connected to said working rolls.

3. A method of calibrating a permanent on-line force measuring means which measures a working force applied to a pair of work rolls mounted in a mill housing by work roll chalks, comprising the steps of:

inserting at least two spaced apart calibration force measuring means between said work rolls with interface members softer than both the work rolls and the calibration force measuring means between the work rolls and the calibration force measuring means; and preventing rotation of said work rolls.

* * * * *